United States Patent [19]

Oaks et al.

[11] 4,253,788

[45] Mar. 3, 1981

[54] FILM UNLOADING AND HANDLING MECHANISM

[75] Inventors: Frank B. Oaks, Seattle; Amos H. Ramquist, Redmond, both of Wash.

[73] Assignee: CX Corporation, Seattle, Wash.

[21] Appl. No.: 931,954

[22] Filed: Aug. 8, 1978

[51] Int. Cl.[3] .......................... B65G 65/04; G03B 1/56

[52] U.S. Cl. .................................... 414/403; 414/416; 226/91

[58] Field of Search ................ 414/403, 404, 411–413, 414/416, 417; 226/91, 92; 354/312–314; 270/67, 80, 83

[56] References Cited

U.S. PATENT DOCUMENTS

| | | | |
|---|---|---|---|
| 3,780,922 | 12/1973 | Bloemendaal et al. | 226/92 |
| 3,921,878 | 11/1975 | Zangenfeind | 226/91 |
| 4,004,724 | 1/1977 | Zangenfeind et al. | 226/91 |
| 4,076,135 | 2/1978 | Klose | 414/403 |
| 4,094,726 | 6/1978 | Hujer et al. | 354/313 X |

*Primary Examiner*—Stephen G. Kunin
*Assistant Examiner*—Terrance L. Siemens
*Attorney, Agent, or Firm*—Christensen, O'Connor, Johnson & Kindness

[57] ABSTRACT

A device for unloading exposed film from a cassette, discarding a backing strip which is wound with the film, discharging the cassette body and conveying the film to a light-free storage box. The cassette is initially loaded into the device through a shutter-closable aperture and received by a downwardly inclined cradle. Upon initiation of the loading cycle, the loading aperture shutter closes and a pneumatic ram lifts the cradle to place the cassette against the inlet of a film guide. A motor raises a violator probe after the cassette is in place to guide the backing paper between a pair of powered rollers which draw the backing strip from the cartridge thereby carrying the film into the film guide. The backing strip is discharged through a series of ducts to be discharged outside the machine. Film entering the guide is directed past the storage box by a pair of pivotally mounted guide doors which open when the leading edge of the film reaches a downstream optical sensor to allow film to enter the storage box. After all of the film has been removed from the cassette and processed by downstream splicer mechanisms, the cassette cradle is lowered and the cassette is discharged through a series of ducts outside the machine. The loading aperture shutter then opens to receive a new cassette. If the backing strip fails to draw the film from the cassette, the film is automatically rewound into the cassette, the cradle is lowered and the cartridge is routed into a light-free bag instead of the discharge receptacle.

32 Claims, 14 Drawing Figures

FIG. 4
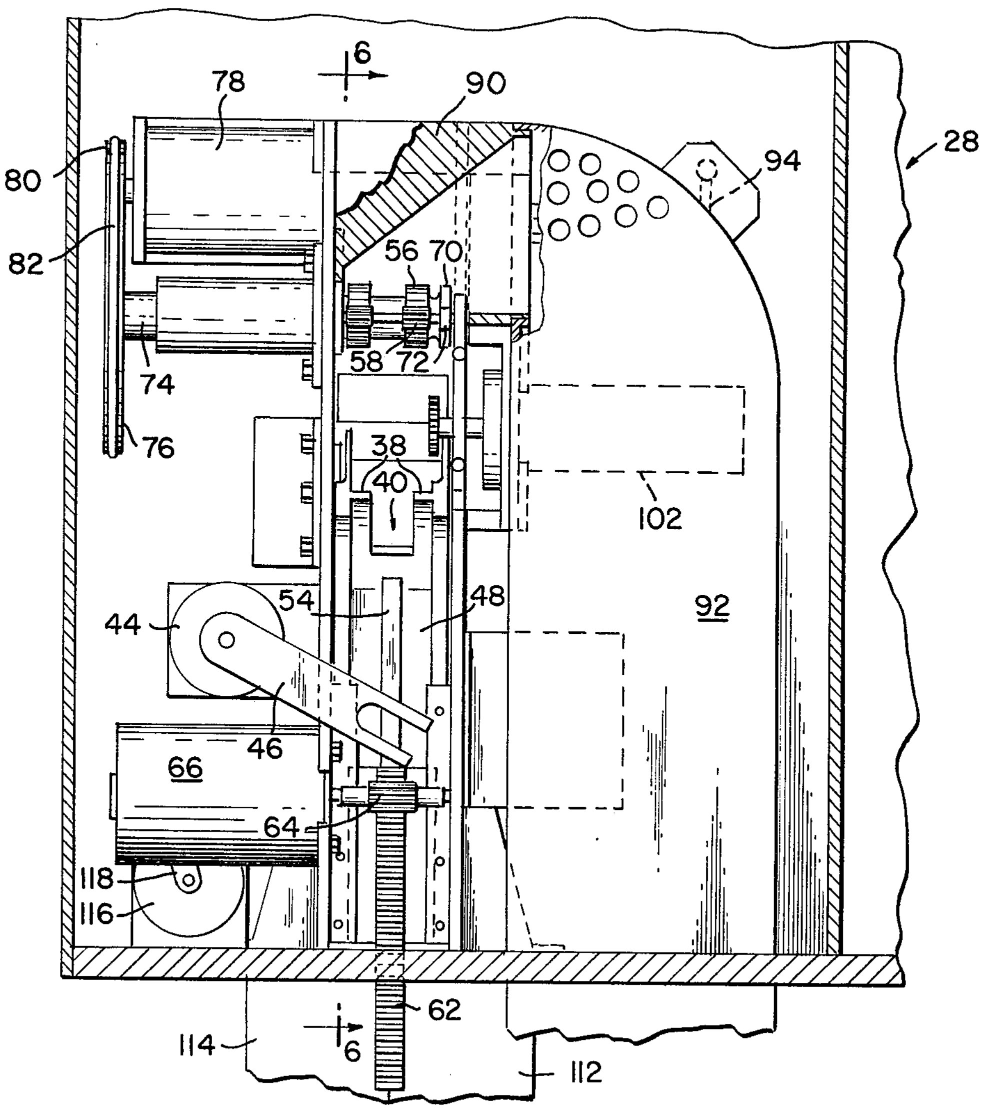
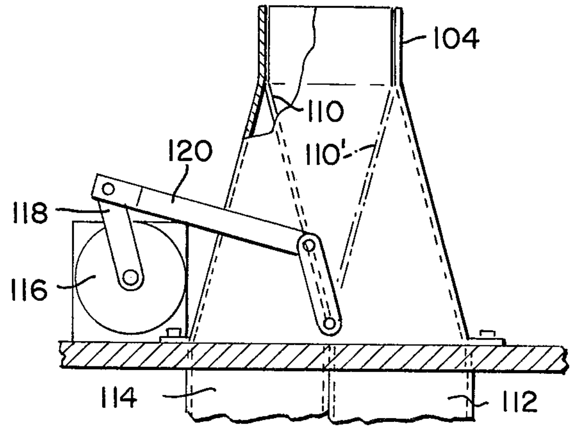
FIG. 5

FIG. 6
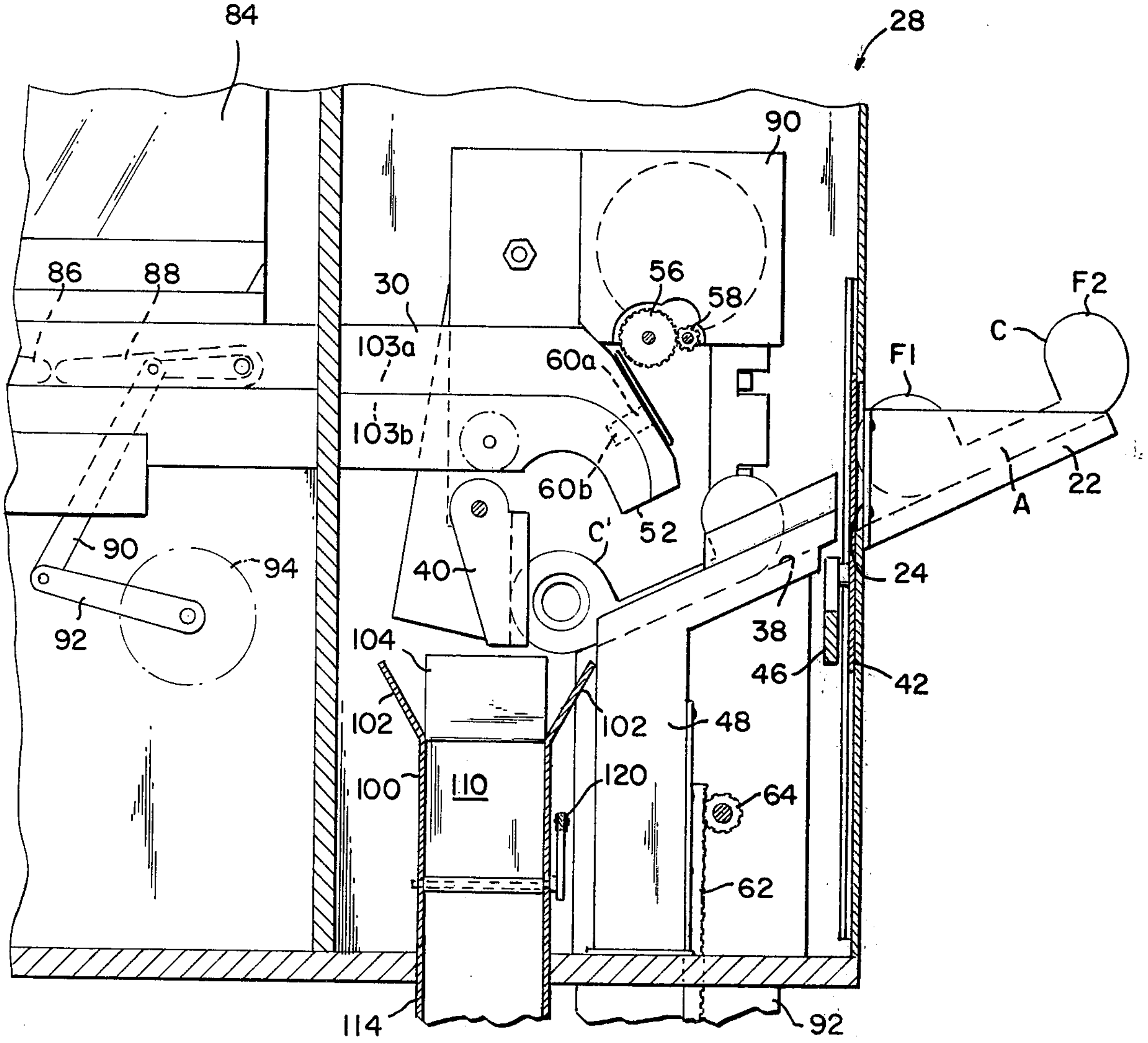
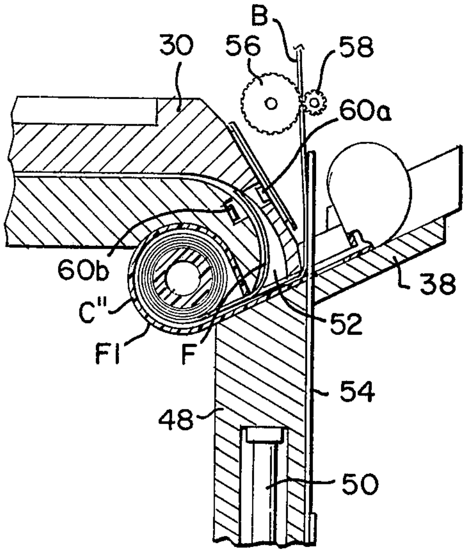
FIG. 7

FILM UNLOADING AND HANDLING MECHANISM

BACKGROUND OF THE INVENTION

1. Field of the Invention

This invention relates to film processing apparatus and, more particularly, to a mechanism for unloading exposed film from a film cassette in a lighted area for splicing and subsequent processing.

2. Description of the Prior Art

Film splicers for joining individual lengths of film end-to-end are in common use in the film processing industry. Although such splicers greatly improve the efficiency of film processing in comparison to processing individual lengths of film, they nevertheless suffer from a variety of problems.

The initial problem is encountered at the front end of the splicer when the film is being unloaded from a cartridge. To prevent the film from being inadvertently exposed during the unloading process, the splicer must generally be operated in a darkroom. The darkroom is far from an ideal working environment so that the efficiency of the operating personnel is somewhat limited. Consequently, the capacity of such splicers is significantly lower than the capacity would be if the operators were permitted to work in a properly illuminated environment.

Recently "daylight" film splicers have entered the market which allow film to be loaded into a film splicer from a cassette in a properly illuminated environment. One such device is described in U.S. patent application Ser. No. 839,603, assigned to the assignee of this application. These recently developed daylight splicers are only semi-automatic so that they require relatively extensive manual manipulation of the cassette in order to load film into the splicer. The requirement of an operator for loading film into the splicer seriously reduces the throughput capacity of such splicers and introduces the possibility of error in film handling.

Another problem associated with conventional semiautomatic daylight splicers is their inability to adequately deal with film cassettes in which the film is incorrectly withdrawn from the cassette. Normally, as the backing strip is removed from the cassette thereby carrying the film from the cassette with it the backing strip protects the film from exposure to the daylight environment. However, a relatively small percentage of the cassettes which are unloaded become jammed so that the backing strip is removed from the cassette leaving the film behind. Another problem associated with an even smaller percentage of cassettes is that the film does not immediately exit the cassette but instead makes a complete loop within the cassette and exits the cassette backing strip so that the film is exposed to the daylight environment. The first above-mentioned problem is dealt with by segregating the cassette and subsequently processing it in a darkroom environment by conventional, non-automatic means. The second above-mentioned problem is generally not dealt with in any satisfactory manner by conventional semi-automatic splicers so that a small percentage of film becomes inadvertently exposed.

SUMMARY OF THE INVENTION

It is an object of the invention to automatically unload film from a film cassette without operator manipulation other than to insert the cassette through an aperture.

It is still another object of the invention to automatically direct those cassettes from which film cannot be easily removed or from which the film has been incorrectly withdrawn without hazard of exposure to a particular location where they can receive special processing.

It is still another object of the invention to provide a film unloading mechanism having extremely high throughput capacity and which is incapable of inadvertently exposing film removed from the cassette.

These and other objects of the invention are accomplished by a mechanism which automatically unloads exposed film from a conventional film cassette at a high rate of speed and conveys the film to a light-free storage box is preparation for subsequent processing. The cassette is loaded into the mechanism through a shutter closable aperture and received by a cradle which places the leading edge of the film adjacent the inlet of an elongated film guide. A powered mechanism then engages a backing strip wound with the film which removes the backing strip from the cassette thereby carrying the film from the cassette into the film guide. The cassette and backing strip are then directed to respective disposal ducts. The leading edge of the film is guided past a light-free storage box by a pair of pivotally mounted guide doors until the leading edge has moved beyond the storage box and past a sensor at which time the guide doors pivot open thereby allowing the film to loop itself into the storage box. The operation of the film unloading and handling mechanism is controlled by a microprocessor and related electronic drive circuits so that it is capable of compensating for a variety of problems typically associated with removal of film from cassettes. Thus, the mechanism detects a condition whereby the film is jammed in the cassette and automatically rewinds the film back into the cassette and directs the cassette to a particular container for special handling. The mechanism is also able to detect when film is being incorrectly unloaded from the cassette in order to prevent inadvertent exposure of the film.

BRIEF DESCRIPTION OF THE FIGURES OF THE DRAWINGS

FIG. 4 is a cross-sectional view taken along the line 4—4 of FIG. 3.

FIG. 5 is a side elevational view of the mechanism for directing processed cassettes to a first location for discard or to a second location for special handling.

FIG. 6 is a cross-sectional view of the film handling and unloading mechanism taken along the line 6—6 of FIG. 4.

FIG. 7 is a cross-sectional view of the cassette cradle and film guide inlet showing film being loaded into the film guide.

DETAILED DESCRIPTION OF THE INVENTION

Figure 1:
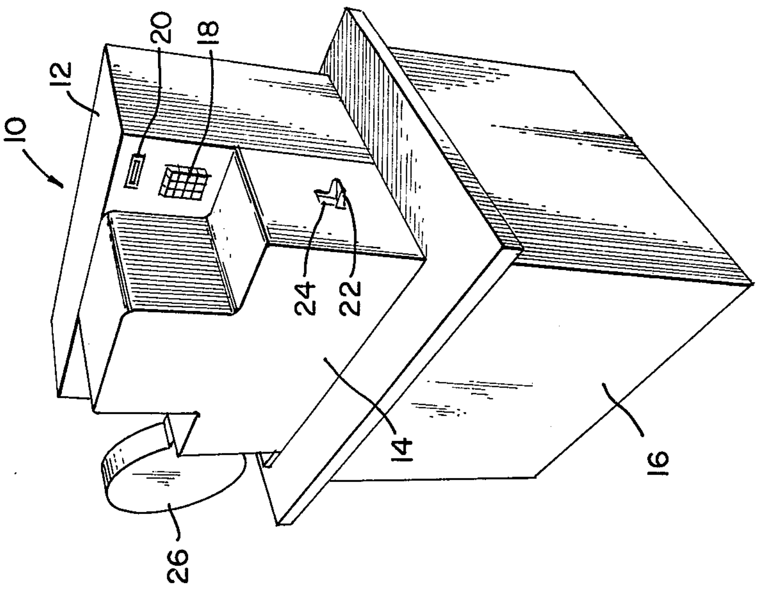
FIG. 1 as an isometric view of a film splicer employing the inventive film unloading and handling mechanism.

A tape splicer employing the inventive film unloading and handling system is illustrated in FIG. 1. The splicer 10 includes an electrical section 12 and a mechanical section 14 mounted on a platform or table 16. A side panel of the electrical portion 12 includes a keyboard 18 for entering data and control commands into the system, and an alpha-numeric display 20 for outputing information and data. Conventional film cassettes having a pair of cylindrical film storage chambers spaced apart from each other by a rectangular film pad and an exposure number window are loaded into the mechanical portion 14 by placing the cassettes onto a chute 22 and allowing the cassettes to slide through a loading aperture 24. Thereafter, film is removed from the cassette and spliced to a previously unloaded length of film before being wound onto a takeup reel 26.

Figure 2:
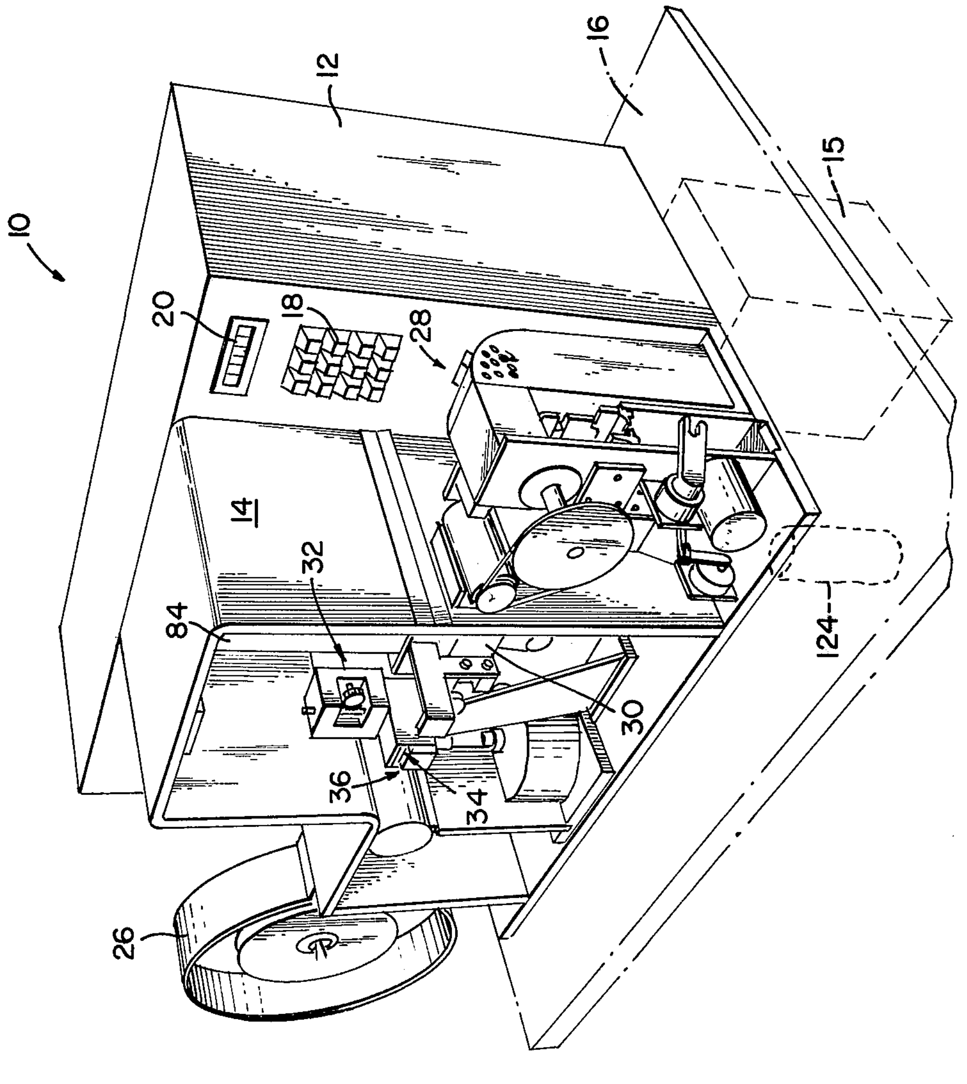
FIG. 2 is an isometric view of the splicer illustrated in FIG. 1 with its side cover removed thereby showing its internal mechanism.

The internal features of the splicer 10 are illustrated in FIG. 2. The cassettes are initially received by the inventive film unloading and handling mechanism, 28 described in detail hereinafter, which places the film into an elongated film guide 30 and conveys the empty cassette and a backing strip wound with the film into a discharge receptacle 15 enclosed by the sidewalls of the platform 16. The ends of the film traveling through the film guide 30 are trimmed by a cutter 32 before its leading edge is fastened to the trailing edge of a previously unloaded length of film by a splicer 34. Finally, an identifying number is exposed onto the film by a projector 36 before the film is wound onto the takeup reel 26. Except for the features of the film unloading and handling mechanism 28, the remaining features of the splicer are described in detail in U.S. patent application Ser. No. 839,603 filed on Oct. 5, 1977 by John H. Siegel et al and assigned to the assignee of this application.

Figure 3:
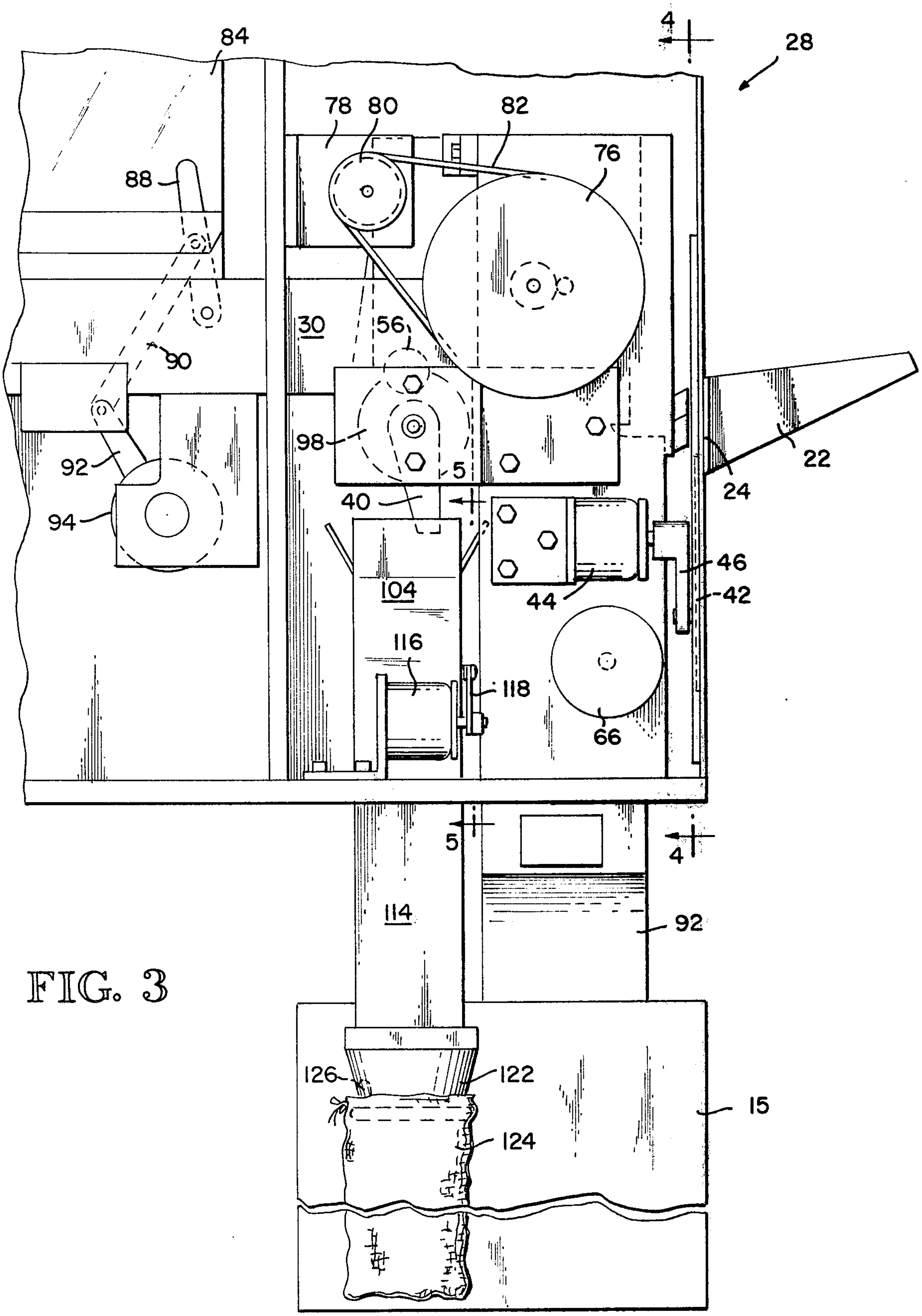
FIG. 3 is a side elevational view of the film unloading and handling mechanism.

The film unloading and handling mechanism 28 is illustrated in further detail in FIGS. 3, 4 and 6. As explained above, a conventional film cassette C having a pair of cylindrical film containers F1, F2 connected to each other by a central portion A containing a film pad on which the film to be exposed rests and a rectangular exposure number window is initially placed on the chute 22. When the cassette C is released, it slides down the chute 22 through the loading aperture 24 onto a cassette cradle 38. Since the cradle 38 is inclined downwardly away from the chute 22 the cassette C moves along the cradle 38 until it contacts a discharge door 40 described in greater detail hereinafter. The loading aperture 24 is selectively closed by a shutter 42 which is moved between an open and closed position by a rotary actuator 44 through an arm 46.

The cassette cradle 38 is mounted on a vertically disposed podium 48 which, as illustrated in FIG. 7, houses an internal pneumatic ram 50. After the cassette has reached the position C′ illustrated in FIG. 6, pressurized air is directed to the ram 50 to place the cassette in the position C″ illustrated in FIG. 7 in which the film exit from the cassette is placed against an inlet 52 of the film guide 30.

After the cassette cradle 38 raises the cassette to the position C″, an elongated violator probe 54 is quickly raised to an upper position through the exposure number window thereby removing a backing strip B wound with the film F from the cassette C and placing it between a pair of feed rollers 56, 58. As the violator plunger 54 removes a portion of the backing strip B from the cassette C, the film F is carried into the inlet 52 of the film guide 30. In normal operation, movement of the backing strip B to the rollers 56, 58 advances the film F a sufficient distance so that the leading edge of the film F extends beyond a first infrared light sensor 60 of conventional variety. The infrared light sensor 60 verifies that film F is being removed from the cassette C properly thereby indicating that normal operation of the mechanism should continue.

The violator probe 54 extends upwardly from a rack 62 which meshes with a pinion gear 64 driven by a conventional DC motor 66. It will be understood that the violator probe 54 may be actuated by other actuating devices either pneumatic or electrical.

After the violator probe 54 has placed the backing strip B between the feed rollers 56, 58 as illustrated in FIG. 7, the feed rollers 56, 58 are rotated thereby pulling the remaining length of backing strip B from the cassette C which in turn carries film F from the cassette C through the inlet 52 and into the film guide 30. The backing strip feed rollers 56, 58 each rotate with a gear 70, 72, respectively, and one of the gears 70 is connected through a shaft 74 to a sheave 76. The sheave 76 is driven by a conventional electric motor 78 through an output sheave 80 and flexible belt 82.

Figure 9:
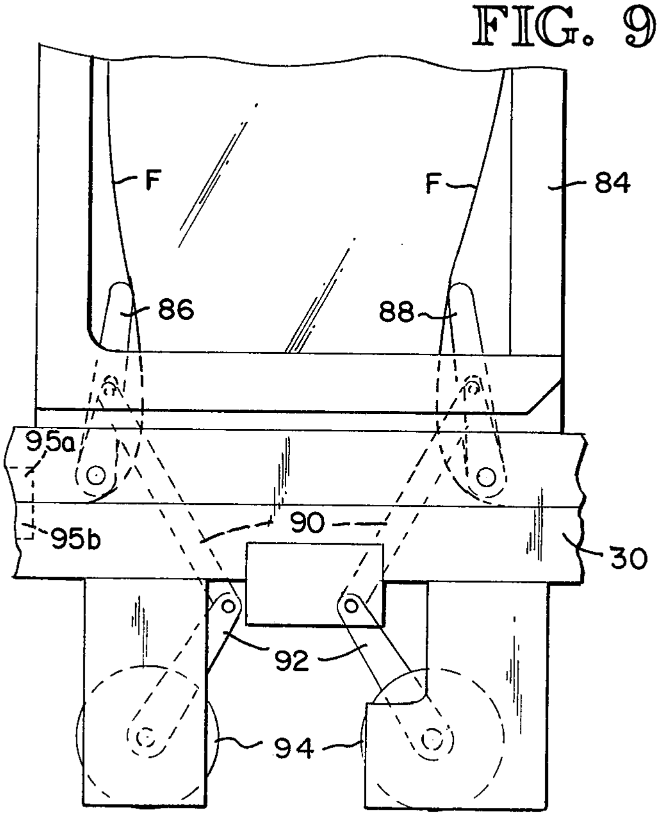
FIG. 9 is a side elevational view of the film storage box and guide doors for selectively allowing film to enter the storage box.

As the film F advances through the film guide 30, it is guided past a generally rectangular film storage box 84 by a pair of pivotally mounted guide doors 86, 88 each of which is moved between the closed position illustrated in FIG. 6 and an open position illutrated in FIG. 9 through a pair of pivotally interconnected links 90, 92 by a conventional rotary actuator 94 which may be a conventional rotary solenoid 94. When the leading edge of the film F reaches a second infrared sensor 95 positioned downstream of the storage box 84 the guide doors 86, 88 are opened thereby allowing the remaining film F to enter the storage box 84. The sensor 95 also actuates a film drive motor 97 (FIG. 6) to move the film F through the film guide 30. The ends of the film F can then be trimmed by the cutter 32 (FIG. 2) before it is spliced to the trailing edge of the previously loaded length of film by the splicer 34. The guide doors 86, 88 are closed at the start of a cycle as film F passes through the first light sensor 60.

The storage box 84 allows all of the film F to be unloaded from the cassette before the ends of the film are cut. In a relatively small percentage of cases, the film F jams in the cassette C. By insuring that the film has been removed from the cassette before its ends are trimmed, the film F can be rewound in the event of a film jam and placed in its original condition as explained hereinafter. Also, in an extremely small percentage of instances, the film F does not exit from the cylindrical film container F1 but instead winds around the opposite side of the backing strip so that withdrawal of the backing strip B carries the film F between the pull rollers 56, 58. Under these circumstances, the absence of film entering the film guide 30 is detected by the sensor 60 to prevent the pull rollers 56, 58 from rotating and to cause the film F to be rewound as explained hereinafter.

Figure 10:
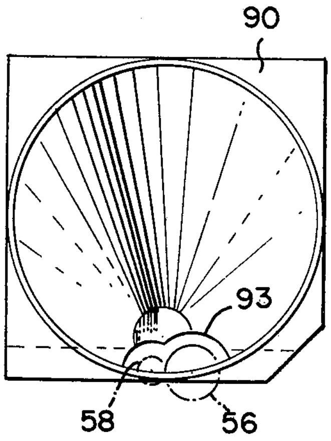
FIG. 10 is a side elevational view of a frusto-conically shaped guide for directing backing strips from cassettes into a discharge chute.
Figure 11:
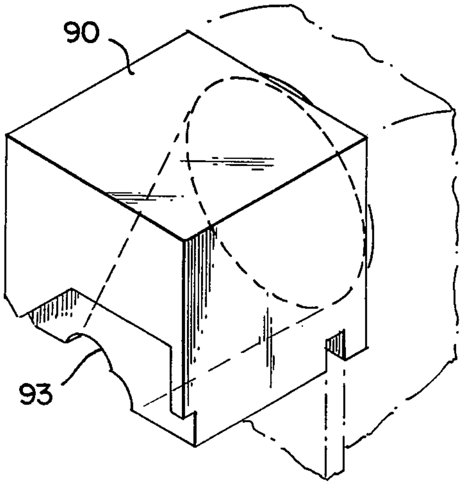
FIG. 11 is an isometric view of the frusto-conically shaped guide of FIG. 10.

The backing strip B is removed from the film unloading and handling mechanism through a unique discharge guide which is best illustrated in FIGS. 4, 10 and 11. The backing strip pull rollers 56, 58 nest within a paper guide member 90 for guiding the backing strip B from the rollers 56, 58 to a downwardly extending discharge chute 92. The guide member 90 has a frustoconically shaped guide surface forming a relatively narrow inlet and a relatively broad outlet. Cylindrically shaped cutouts 93 are formed in the guide member 90. The pull rollers 56, 58 thus guide the backing strip directly into frusto-conically shaped cavity and into the discharge chute 92. An air nozzle 94 positioned at the upper end of the discharge chute 92 directs an air jet downwardly to carry the backing strip B through the chute 92 into a discharge receptacle.

After all of the film F has been removed from the cassette C and the film has been spliced to the previously unloaded film the pressurized air is removed from the pneumatic ram 50 thereby allowing the cassette cradle 38 to lower to the position illustrated in FIG. 6. The discharge door 40 is then pivoted open by energizing a rotary actuator 98 (FIG. 3). The cassette C is then free to slide downwardly along the cassette cradle 38 into a discharge hopper 100 formed by a pair of upwardly diverging walls 102. The discharge hopper 100 opens into a cassette discharge chute 104 which carries the cassette to the discharge receptacle 15 (FIG. 2).

Figure 8:
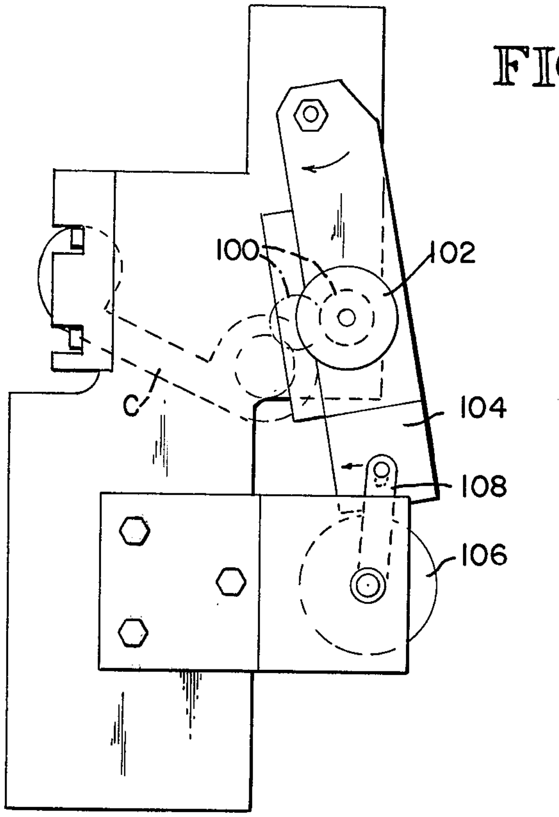
FIG. 8 is a side elevational view of the mechanism for rewinding film into the cassette in the event of an abnormal unloading situation.

As mentioned above, in a relatively low percentage of instances it is necessary to rewind the film F into the cassette C. The mechanism for performing this function is best illustrated in FIG. 8. A rewind gear 100 driven by a conventional motor 102 is mounted on a frame 104 which is pivotally mounted for movement toward and away from the cassette C. During an unloading operation if either the first infrared sensor 60 the third downstream infrared sensor 95 (FIG. 9) or a second infrared sensor 103 (FIG. 6) does not detect the presence of film within a predetermined period, the frame 104 is pivoted toward the cassette C by a conventional rotary solenoid 106 through an actuating arm 108. The rewind gear 100 then meshes with a gear formed by a spool on which the film in the cassette is wound and the motor 102 is energized to rewind film into the cassette C. After a predetermined period, the solenoid 106 moves the rewind gear 100 out of engagement with the gear on the cassette, the discharge door 40 is opened and the casset cradle 38 is lowered as explained above. The cassette C is then discharged into the discharge chute 104. Since the cassette into which the film has been rewound must be specially processed, it is necessary to segregate these cassettes from the cassettes from which all of the film has been removed. For this purpose, a deflection mechanism illustrated in FIG. 5 is positioned at the outlet of the discharge chute 104. The deflection mechanism includes a deflection door 110 which is pivotally mounted for movement between two positions 110, 110′ one of which directs the cassette into a first discharge conduit 112 while the other of which 110′ directs the cassette into a second discharge conduit 114. The deflection door 110 is moved between its two positions by a conventional rotary actuator 116 such as a solenoid through a pair of pivotally interconnected lengths 118, 120. The first discharge conduit 112 leads to the discharge receptacle 15 while the second discharge conduit has an outlet 122 (FIG. 3) covered by a light-impermeable bag 124. Thus, film cassettes which must be specially handled such as those in which film has jammed in the cassette or the film has exited the cassette on the reverse side of the backing strip are directed to the bag 124 after all of the film has been rewound into the cassette.

In order to insure that the bag containing the cassette in need of special handling has been removed before subsequent cassettes are loaded into the splicer 10 a light sensor 126 is mounted adjacent the outlet 122 of the second discharge conduit 114. The light sensor 126 detects that the bag 124 has been removed from the outlet 122 and prevents further operation of the splicer 10 until the bag 124 has been repositioned over the outlet 122.

Figure 12A:
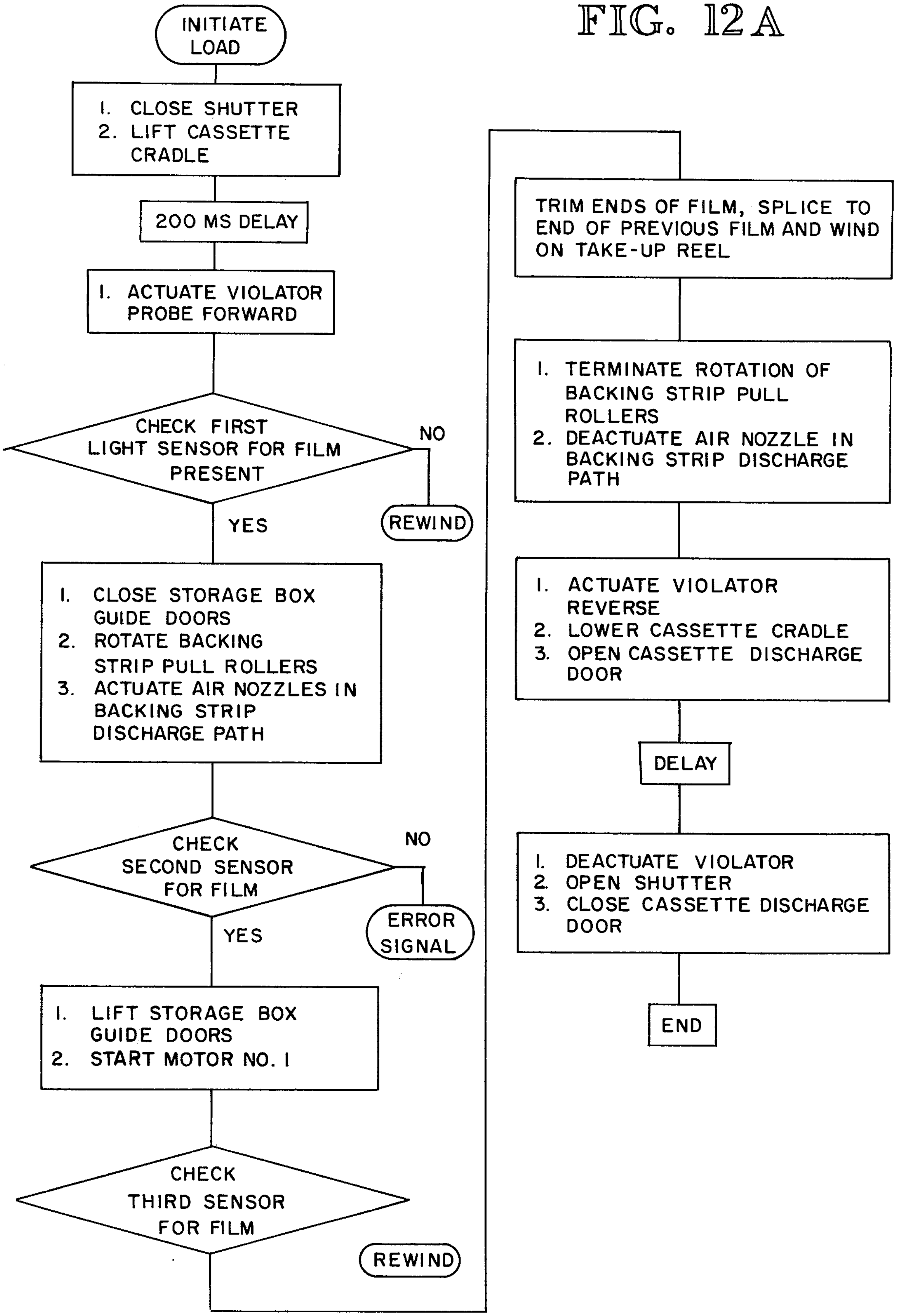
FIGS. 12A–12C comprise a flow chart of the program executed by an internal microprocessor for controlling the operation of the film unloading and handling mechanism.
Figure 12B:
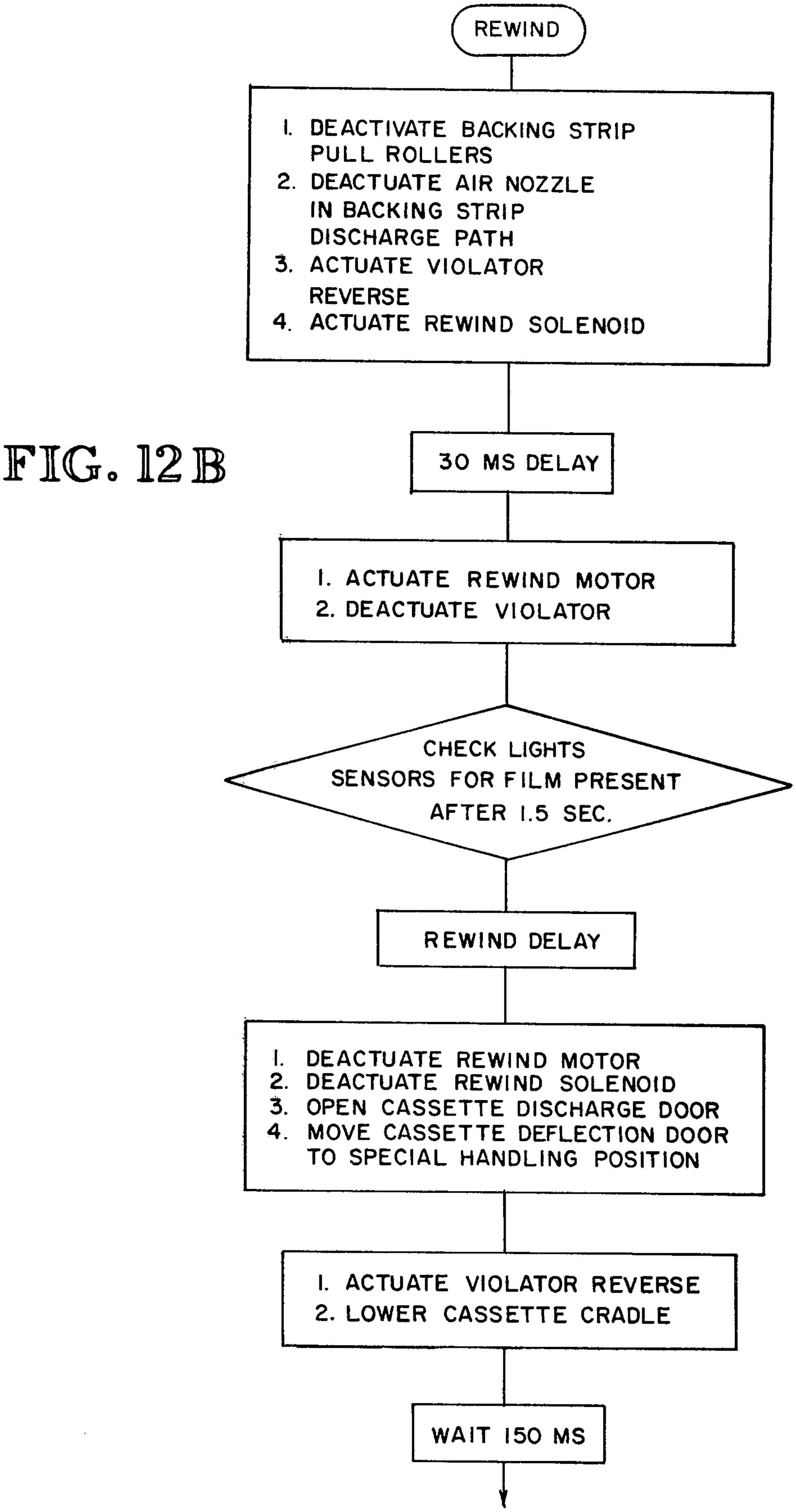
Figure 12C:
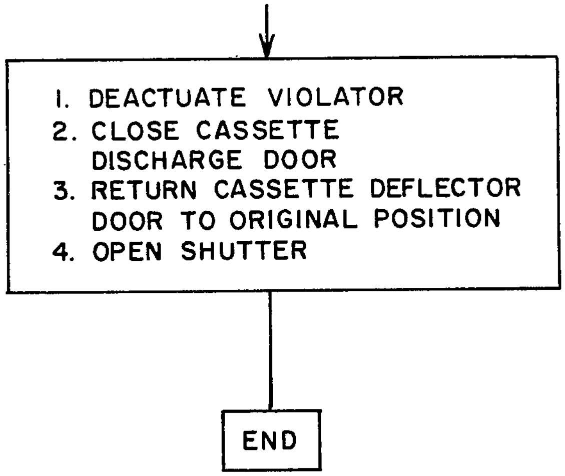

The operation of the entire splicer 10 including the film unloading and handling mechanism is controlled by a conventional microprocessor. Operation of the film unloading and handling mechanism can best be explained with reference to the flow chart (FIGS. 12A–12C) for the computer program executed by the microprocessor illustrated in FIG. 1. It will be understood, however, that the unloading and handling mechanism could be controlled by other types of conventional electrical devices. The loading is initiated by placing the cassette C on the inlet chute 22 and allowing the cassette C to pass through the loading aperture 24 onto the cassette cradle 38. In the first operational sequence, the shutter 42 is closed, the cassette cradle 38 is raised by actuating the pneumatic ram 50. After a 200 millisecond delay to provide sufficient time for the cassette C to be raised to the position C″ illustrated in FIG. 7, the violator probe 54 is raised by energizing the motor 66 thereby carrying the backing strip B between the backing strip pull rollers 56, 58. The first infrared sensor 60 is then checked to determine whether withdrawal of the backing strip B from the cassette C has resulted in film entering the inlet 52 of the film guide 30. If the leading edge of the film F has not passed beyond the infrared sensor 60 the program jumps to a rewind subroutine as explained hereinafter. If film has passed the sensor 60, the storage box guide doors 86, 88 are closed by the actuator 94, the backing strip feed rollers are rotated to remove the backing strip B from the cassette C and the air nozzle 94 in the backing strip discharge chute 92 is actuated to convey the backing strip to the discharge container. Removal of the backing strip B from the cassette C normally continues to unload film F from the cassette C. After 500 milliseconds, the leading edge of the film F should reach the second infrared sensor 95 which is positioned in the film guide 30 downstream from the storage box 84. If the leading edge of the film F has not reached this point within 500 milliseconds an error signal is generated and the system is shut-down. If, however, the leading edge of the film F has reached the second infrared sensor, the film drive motor 97 is energized and the storage box guide doors 86, 88 are opened by energizing the rotary actuators 94 to allow film to naturally curl into the storage box 84 as withdrawal of the backing strip B from the cassette C continues to carry film into the film guide 30. The third film sensor 103 is then checked to verify that the trailing end of the film F has passed in order to continue the processing cycle. If the film F has not passed the sensor 103 the system jumps to a rewind subroutine. The remaining portion of the splicer then trims the ends of the film and splices the leading end of the film to the trailing end of the previously unloaded film and winds the film onto the takeup reel 26. A flow chart and computer program for performing these functions, depicted in FIGS. 12A—12C, is contained in the aforementioned previously filed U.S. Patent application.

After the film F has been unloaded from the cassette and processed as explained above, the air nozzle 94 in the backing strip discharge chute 92 is de-energized and rotation of the discharge strip pull rollers 56, 58 terminates. The violator plunger 54 is then moved downwardly by energizing the motor 66 in reverse, air is removed from the pneumatic ram 50 to lower the cassette cradle 38 and the cassette discharge door 40 is opened by energizing the rotary actuator 98. After a delay sufficient to allow the cassette cradle to be lowered and the cassette C to slide downwardly into the hopper 100, the violator motor 66 is de-energized, the shutter 42 is opened and the cassette discharge door 40 is closed thereby terminating the unloading and handling cycle and allowing a new cassette to be unloaded into the splicer.

In the event that a rewind becomes necessary, the rewind subroutine initially terminates rotation of the backing strip pull rollers 56, 58, deactuates the air nozzle 94 in the backing strip discharge chute, opens the storage box guide doors 86, 88 and lowers the violator probe 54 by energizing the motor 66 in reverse. After a 30 millisecond delay, the rewind motor 102 is energized and the violator motor 66 de-energized. The infrared sensors are then checked to determine whether film is still present in the film guide 30. If the film is present the system is shut down pending investigation and possible repair. If the film has been removed from the film guide 30, the rewind subroutine continues. After a predetermined delay of a sufficient period to allow all of the film to be rewound into the cassette, the rewind motor 102 is de-energized, the solenoid 106 withdraws the rewind gear 100 from the cassette rewind gear, the cassette discharge door 40 is opened and the deflection door 110 is moved to the position 110' (FIG. 5) to direct the cassette to the second discharge guide 114 into the special handling bag 124. The violator probe 54 is then lowered by energizing the motor 66 in reverse and air pressure is removed from the pneumatic plunger 50 in order to lower the cassette cradle 38. After a 150 millisecond delay, the violator motor 66 is de-energized, the cassette discharge door 40 is closed, the cassette deflector door 110 is returned to its original position and the shutter 42 is opened to allow a new cassette to be loaded through the loading aperture 24.

The inventive film unloading and handling mechanism is thus able to automatically remove film from a conventional cassette at a high rate of speed while compensating for unpredictable non-uniform characteristics of cassettes which prevent the film from being unloaded in a normal manner.

We claim:

1. An apparatus for unloading film from an elongated cassette into a film guide, said cassette having first and second cylindrical film storage chambers spaced apart from each other by a rectangular exposure window with said first film storage chamber containing a roll of exposed film wound with a backing strip, said apparatus comprising:

a cassette support adapted to receive said cassette;

first powered means for placing an access opening of said first storage chamber adjacent an inlet of said film guide responsive to a first control signal;

second powered means for withdrawing said backing strip from said cassette responsive to a second control signal thereby conveying said film from said cassette into said film guide;

conveying means for moving said cassette from said cassette support and said backing strip from said second powered means responsive to a third control signal; and system control means for sequentially generating said first, second and third control signals.

2. The apparatus of claim 1 further including rewind means for rewinding said film into said storage chamber and for conveying said cassette to a special handling container responsive to a condition in which said backing strip fails to convey said film into said film guide.

3. The apparatus of claim 2 wherein said rewind means comprise:

film sensing means mounted in said film guide for detecting the absence of film a predetermined time after said second control signal and for generating a rewind control signal responsive thereto;

a rewind gear selectively engaging a sprocket on which said film is wound;

means for rotating said rewind gear responsive to said rewind control signal; and guide means receiving said cassette from said cassette support and directing said cassette to a special handling container.

4. The apparatus of claim 3 wherein said film sensing means comprise an infrared source and an infrared sensor positioned at opposite surfaces of said film guide closely adjacent said inlet such that film entering said film guide passes between said light sensor and light source thereby providing an indication that film has entered said film guide.

5. The apparatus of claim 3 wherein said conveying means include:

a cassette discharge chute;

a cassette discharge door positioned adjacent said cassette support allowing said cassette to enter said discharge chute in an open position;

first actuator means for opening said discharge door responsive to said third control signal;

and wherein said guide means include:

a first discharge conduit having an outlet in said special handling container;

a second discharge conduit having an outlet in a discharge receptacle;

a deflection door mounted in said discharge chute operable in a first position to deflect a cassette passing through said discharge chute into said first discharge conduit and in a second position to deflect said second cassette into said second discharge conduit; and second actuator means for moving said deflection door to said first position responsive to a rewind control signal and for moving said deflection door to said second position responsive to the absence of a rewind control signal.

6. The apparatus of claim 2 further including monitoring means for generating a container empty indication when said cassette has been removed from said special handling container and control interface means for preventing said system control means from generating said first, second and third control signals until said monitoring means produces a container empty indication.

7. The apparatus of claim 6 wherein said monitoring means and said interface means comprise:
- light sensing means positioned such that removal of said cassette from said special handling container in a daylight environment allows light to reach said sensor; and
- detecting means for generating said empty indication at the end of a sequence in which light illuminates said light sensing means and is then shielded from said light sensing means.

8. The apparatus of claim 7 wherein said special handling container includes a light-free receptacle secured to the outlet of a conveying chute, and said light sensing means is mounted adjacent the outlet thereof such that removal of said receptacle from said chute to remove the cassette contained therein allows light to illuminate said sensor.

9. The apparatus of claim 1 wherein said cassette support is surrounded by an enclosure having an access aperture through which said cassette is inserted to place said cassette on said cassette support, said apparatus further including a shutter for selectively covering said loading aperture to shield said cassette from light as film is removed therefrom, said shutter being actuated to a closed position prior to said second control signal and to an open position subsequent to said third control signal.

10. The apparatus of claim 1 wherein said second powered means comprise:
- a pair of rotatably driven roller positioned closely adjacent each other;
- an elongated violator probe;
- violator means for moving one end of said violator probe through and beyond the exposure number window of said cassette to said rollers thereby placing said backing paper between said rollers to allow said rollers to withdraw said strip from said cassette.

11. The apparatus of claim 1 wherein said conveying means include:
- a cassette discharge chute;
- a cassette discharge door positioned adjacent said cassette support allowing said cassette to enter said discharge chute in an open position; and
- actuator means for opening said discharge door responsive to said third control signal.

12. The apparatus of claim 1 wherein said conveying means include:
- a backing strip discharge chute having an outlet opening into a backing strip discharge receptacle;
- backing strip guide means positioned between said second powered means and said backing strip discharge chute, said guide means having a generally frusto-conically shaped surface forming a narrow inlet and a broad outlet with said inlet receiving said backing strip from said second powered means and discharging said backing strip through said outlet to said discharge chute; and
- air nozzle means mounted in said discharge chute for producing an air jet in said discharge chute toward said discharge receptacle thereby conveying said backing strip along the length of said chute into said discharge receptacle.

13. The apparatus of claim 12 wherein said second powered means include a pair of rotatably driven rollers positioned closely adjacent each other and means for placing said backing strip between said rollers to allow said rollers to withdraw said backing strip from said cassette, and wherein said paper guide means at least partially encloses said rollers closely adjacent said inlet such that said rollers feed said backing strip directly into said inlet.

14. The apparatus of claim 1 further including:
- a film storage box having a generally rectangular opening positioned adjacent said film guide downstream from the inlet thereof at an orientation facing the natural bend of said film such that said film naturally loops into said storage box from said film guide;
- a pair of guide doors pivotally mounted at opposite sides of said opening for movement between a closed position in which said guide doors extend toward each other substantially parallel to said film guide to cover said opening and an open position in which said guide doors extend into said storage box to allow said film to naturally loop therein; and
- actuator means for opening and closing said guide doors responsive to respective guide door open and close signals.

15. The apparatus of claim 14 further including means for controlling the operation of said actuator means, comprising:
- film sensing means positioned in said film guide downstream of said film storage box for generating a guide door trigger signal responsive to a predetermined portion of said film being positioned adjacent said film sensing means;
- guide door control means operatively connected to said actuator means for closing said guide doors prior to film reaching said storage box and for opening said guide doors responsive to said guide door trigger signal such that withdrawal of said backing strip from said cassette causes film to be unloaded from said cassette and said film to advance through said film guide beyond said storage box before said guide doors open to allow the remaining portion of said film to enter said storage box.

16. An apparatus for unloading film from an elongated cassette into a film guide having a downwardly disposed inlet, said cassette having first and second cylindrical film storage chambers spaced apart from each other by a rectangular film pad containing an exposure number window with said first film storage chamber containing a roll of exposed film wound with a backing strip, said apparatus comprising:
- an enclosure containing an aperture through which said cassette is loaded;
- an elongated cassette cradle surrounded by said enclosure and inclined downwardly away from said loading aperture;
- cassette cradle positioning means for moving said cradle upwardly from a loading position adjacent said aperture to an unloading position in which an access opening of said first storage chamber is positioned adjacent the inlet of said film guide responsive to a first unload signal;
- film unloading means for conveying film from said storage chamber into said film guide including a pair of feed rollers having their peripheries abutting each other and rotating toward each other responsive to a second film unload signal, and violator means for moving an elongated violator probe through and beyond the exposure number window of said cassette to said rollers responsive to a third film unload signal thereby placing said backing strip between said rollers to allow said rollers to withdraw said strip from said cassette and carry film into said film guide;

backing strip guide means positioned adjacent said rollers for directing said backing strip away from said rollers;

cassette discharge means for removing said cassette from said cradle after said cradle has returned to its loading position responsive to termination of said first unload signal including a discharge chute having an outlet opening into a cassette discharge receptacle, a cassette discharge door positioned adjacent the downwardly inclined end of said cassette cradle when said cradle is in its loading position, and discharge door actuating means for opening said discharge door responsive to a cassette discharge signal thereby allowing said cassette to slide downwardly along said cassette cradle into said cassette discharge chute;

control means for generating a process complete signal after all of the film has been unloaded from said cassette;

central processing means for sequentially generating said first, third and second unload signals responsive to said first film position signal, and for terminating said unload signals and generating said cassette discharge signal responsive to said process complete signal.

17. The apparatus of claim 16 further including rewind means for rewinding film into said cassette and for conveying said cassette to a special handling container responsive to a condition in which said backing strip fails to convey said film into said film guide, comprising:

film sensing means mounted in said film guide for detecting the absence of film a predetermined time after said third film unload signal and for generating a rewind control signal responsive thereto;

a rewind gear selectively engaging a sprocket on which said film is wound;

means for rotating said rewind gear responsive to said rewind control signal;

a first cassette discharge conduit having an outlet opening into said special handling container;

a second cassette discharge conduit having an outlet opening into a cassette discharge receptacle;

a cassette deflection door mounted in said discharge chute operable in a first position to deflect a cassette passing through said discharge chute into said first discharge conduit and in a second position to deflect said cassette into said second discharge conduit; and actuating means for removing said deflection door to said first position responsive to a rewind control signal and for removing said deflection door to said second position responsive to the absence of a rewind control signal.

18. The apparatus of claim 16 wherein said backing strip guide means comprise:

a backing strip discharge chute having an outlet opening into a discharge receptacle;

a guide member having a frusto-conically shaped guide surface extending along a horizontal axis forming a relatively narrow inlet receiving said backing strip from said rollers and a relatively wide outlet opening into said discharge chute; and air nozzle means mounted in said discharge chute for producing an air jet in said discharge chute toward said discharge receptacle thereby conveying said backing strip along the length of said chute into said discharge receptacle.

19. Photographic film processing apparatus comprising means for unloading exposed photographic film from an elongated cassette into a film guide having a film inlet, said cassette having first and second cylindrical film storage chambers interconnected in parallel spaced relationship by means forming a film exposure window, said first film storage chamber having a film access opening therein and containing a roll of exposed film wound with a backing strip onto a sprocket rotatably mounted in said first storage chamber, said film unloading means comprising:

a cassette support adapted to receive said cassette;

first powered means associated with said cassette support and operable to position said access opening of said first storage chamber in film transfer relationship with said film inlet of said film guide;

second powered means associated with said cassette support and operable to withdraw said backing strip and film from said cassette;

stripping means associated with said cassette support and said film guide and operable to separate said film from said backing strip as said film and said backing strip are withdrawn from said cassette so that as said backing strip is removed from said cassette said film is conveyed to said film guide;

cassette discharge means associated with said cassette support for receiving empty cassettes from which said film has been removed;

film sensing means mounted in cooperable relationship with said film guide for detecting and producing a first signal in response to the absence of film in said film guide upon removal of a predetermined portion of said backing strip from said cassette by said second powered means; of absence of film;

rewind means responsive to said first signal for rewinding said film into said first storage chamber; and diverting means responsive to said first signal and operable to divert from said cassette discharge means said cassettes into which film has been rewound.

20. The apparatus of claim 19 wherein said rewind means includes:

a rewind gear selectively engageable with said sprocket in said cassette on which said film is wound;

drive means for rotating said rewind gear responsive to said first signal;

special handling means associated with said diverter for receiving said rewound cassettes; and cassette guide means associated with said diverter means for receiving said rewound cassette from said cassette support and directing said rewound cassette to said special handling means.

21. The apparatus of claim 20 wherein said diverter means includes:

a cassette discharge chute having an inlet and an outlet, said inlet opening to said cassette support;

a cassette discharge door mounted in cooperable relation with said inlet of said cassette discharge chute, said door being movable between open and closed positions, said door allowing said cassette to enter said inlet of said discharge chute when said door is in said open position;

first actuator means associated with said door for moving said door between said open and closed positions;

and further, wherein said guide means includes:

a first discharge conduit having an outlet positioned in cassette transfer relationship with said special handling means;

a second discharge conduit having an outlet positioned in said cassette transfer relationship with discharge cassette means;

a deflection door mounted in cooperable relation with said outlet of said discharge chute and movable between first and second positions, said deflection door being operable in said first position to deflect a cassette passing through said discharge chute into said first discharge conduit and operable in said second position to deflect a cassette into said second discharge conduit; and second actuator means associated with said film sensing means and said deflection door for moving said deflection door to said first position responsive to said first signal.

22. The apparatus of claim 19 wherein said film sensing means comprises an infrared source and an infrared sensor positioned at opposite surfaces of said film guide closely adjacent said inlet such that film entering said film guide passes between said infrared sensor and said infrared source so as to interrupt the light path from said source to said sensor.

23. The apparatus of claim 19 wherein said special handling means includes:

a special handling container associated with said first discharge conduit for receiving cassettes into which film has been rewound;

monitoring means associated with said special handling container for generating a container empty signal when said cassette has been removed from said special handling container; and interface means associated with said monitoring means and said first and second powered means for preventing operation of said first and second powered means until said monitoring means produces said container empty signal.

24. The apparatus of claim 23 wherein said monitoring means and said interface means comprises:

light sensing means positioned such that removal of said cassette from said special handling container in a daylight environment allows light to reach said light sensing means; and protecting means for generating said container empty signal at the end of a sequence in which light illuminates said light sensing means and is then removed from said light sensing means.

25. The apparatus of claim 24 wherein said special handling container includes a light free receptacle secured to the outlet of said first discharge conduit and said light sensing means is mounted adjacent said outlet such that removal of said receptacle from said discharge conduit to remove the cassette contained therein allows light to illuminate said light sensing means.

26. An apparatus for unloading exposed photographic film from an elongated cassette into a film guide having a film inlet, said cassette having first and second cylindrical film storage chambers interconnected in parallel spaced relationship by means defining a film exposure window, said first film storage chamber having a film access opening therein and containing a roll of exposed film wound with a backing strip, said apparatus comprising:

a cassette support adapted to receive said cassette;

first powered means associated with said cassette support and operable to position said access opening of said first storage chamber in film transfer, light sealing relationship with said inlet of said film guide;

second powered means associated with said cassette support and operable to withdraw said backing strip and said film from said cassette;

stripping means associated with said film guide for separating said backing strip from said film as said film and said backing strip are withdrawn from said cassette and for guiding said film to said inlet of said film guide;

a backing strip discharge receptacle associated with said second powered means for receiving said backing strip after its removal from said cassette;

backing strip conveying means for moving said backing strip from said second powered means to said backing strip discharge receptacle, said conveying means including a backing strip discharge chute having an outlet opening into said backing strip discharge receptacle, backing strip guide means positioned between said second powered means and said backing strip discharge chute, said backing strip guide means having a generally frusto conically shaped surface forming a narrow inlet positioned in backing strip transfer relationship with said second powered means and a broad outlet positioned in backing strip transfer relationship with said backing strip discharge chute; and air nozzle means mounted in cooperable relation with said backing strip discharge chute for producing an air jet in said backing strip discharge chute directed toward said backing strip discharge receptable so as to convey said backing strip along the length of said backing strip discharge chute into said backing strip discharge receptacle.

27. The apparatus of claim 26 wherein said second powered means includes a pair of rotatably driven rollers positioned closely adjacent each other and means cooperable with said rollers and said cassette support for placing said backing strip between said rollers to allow said rollers to withdraw said backing strip from said cassette and wherein said backing strip guide means at least partially encloses said rollers closely adjacent said inlet such that said rollers feed said backing strip directly into said inlet.

28. An apparatus for unloading exposed photographic film from an elongated cassette into a film guide having a film inlet, said cassette having first and second cylindrical film storage chambers interconnected in parallel spaced relationship by means defining a film exposure window, said first film storage chamber having a film access opening therein and containing a roll of exposed film wound with a backing strip, said apparatus comprising:

a cassette support adapted to receive said cassette;

first powered means associated with said cassette support and operable to position said film access opening of said first storage chamber in film transfer relationship with said inlet of said film guide;

second powered means associated with said cassette support and operable to withdraw said backing strip and said film from said cassette;

stripping and directing means associated with said film guide for separating said film from said backing strip as said film and said backing strip are withdrawn from said cassette and for directing said film to the inlet of said film guide;

film drive means associated with said film guide and said second powered means for moving said film along said film guide;

a film storage box having an opening therein positioned along the path of said film through said film guide said box positioned adjacent said film guide and downstream from the inlet thereof, said opening oriented in relation to the natural bend of said film such that said film naturally loops into said storage box from said film guide;

a pair of guide doors pivotally mounted on said film storage box adjacent said opening in said film storage box for movement of said guide doors between a closed position in which said guide doors extend toward each other substantially parallel to said film guide to cover said opening in said film storage box and an open position in which said guide doors extend into said storage box through said opening to allow said film to naturally loop therein; and actuator means associated with said storage box and said guide doors for moving said guide doors between their respective open and closed positions.

29. The apparatus of claim 28 further including first control means for controlling the operation of said actuator means, said first control means comprising:

first film sensing means mounted in cooperable relation with said film guide closely adjacent said inlet thereof for sensing the entry of a leading portion of said film into said film guide and for generating a first signal representative of said entry of said leading portion of said film, second film sensing means positioned in cooperable relation with said film guide downstream of said film storage box for sensing said leading portion of said film and for generating a guide door trigger signal responsive to said leading portion of said film being positioned adjacent said film sensing means;

guide door control means operatively associated with said actuator means and said first and second film sensing means for closing said guide doors in response to said first signal prior to film reaching said film storage box and for opening said guide doors responsive to said guide door trigger signal such that said as said film advances through said film guide beyond said storage box said guide doors are opened to allow the trailing portion of said film to enter said storage box.

30. An apparatus for unloading film from an elongated cassette into a film guide having a downwardly disposed inlet, said cassette having first and second cylindrical film storage chambers interconnected in parallel spaced relationship by a rectangular film pad having an exposure number window formed therein, said first film storage chamber having a film access opening formed therein and containing a roll of exposed film wound with a backing strip onto a sprocket rotatably mounted within said first storage chamber, said apparatus comprising:

an enclosure having a loading aperture formed therein adapted to receive said cassette;

an elongated cassette cradle surrounded by said enclosure and inclined downwardly away from said loading aperture said cradle positioned to receive said cassette as it passes through said loading aperture;

cassette cradle positioning means for moving said cassette cradle between its loading position adjacent said loading aperture and a film unloading position in which said film access opening of said first storage chamber is placed in film transfer relationship with the inlet of said film guide;

violator probe means movable through and beyond said exposure number window to force said backing strip from said first chamber through said film access opening;

a pair of feed rollers rotatably mounted in parallel relation adjacent one another so as to form a nip between their respective peripheries, said rollers positioned in cooperable relation with said violator probe means to receive said backing strip in said nip upon removal of said backing strip from said first storage chamber;

feed roller drive means associated with said feed rollers for driving said rollers oppositely to one another to pull said backing strip and film from said cassette;

stripping means associated with said film guide for separating said film from said backing strip as said film and backing strip are withdrawn from said cassette and for directing said film to the inlet of said film guide;

backing strip guide means positioned adjacent said rollers for directing said backing strip away from said rollers;

a cassette discharge chute having an inlet and an outlet, said cassette discharge chute positioned so that its inlet is in cassette transfer relationship with said cassette cradle when said cradle is in said loading position;

a cassette discharge door positioned in cooperable relation with said inlet of said cassette discharge chute and movable between a closed position in which it blocks entry of said cassette into said chute and an open position in which it permits entry of said cassette into said chute;

discharge actuator means associated with said cassette discharge chute and said cassette discharge door for moving said cassette discharge door between its open and closed positions; and cassette discharge means positioned to receive cassettes from said discharge chute when said cassette discharge door is in said open position.

31. The apparatus of claim 30 further including:

film sensing means mounted in cooperable relation with said film guide for detecting the absence of said film at the inlet of said film guide in response to the removal of a predetermined portion of said backing strip from said cassette and for generating a first signal representative of said absence of said film;

a rewind gear selectively engageable in response to said first signal with said sprocket in said cassette on which said film is wound;

means for rotating said rewind gear responsive to said first signal to rewind said film into said first storage chamber;

a special handling means associated with said cassette cradle for receiving cassettes into which said film has been rewound;

a first cassette discharge conduit having an outlet opening into said special handling means and an inlet opening into said cassette discharge chute;

a second cassette discharge conduit having an outlet opening into said cassette discharge receptacle and an inlet opening into said cassette discharge chute;

a cassette deflection door mounted in cooperable relation with said outlet of said cassette discharge chute movable between a first position in which it deflects cassettes passing through said discharge chute into said first discharge conduit and a second position in which it deflects cassettes passing through said discharge chute into said second discharge conduit; and actuating means associated with said deflection door and said film sensing means for moving said deflection door to said first position responsive to said first signal and for moving said deflection door to said second position responsive to the absence of said first signal.

32. The apparatus of claim 30 further including:

a backing strip discharge receptacle;

a backing strip discharge chute having an outlet opening into said backing strip discharge receptacle;

a backing strip guide member having a frusto conically shaped guide surface extending along a horizontal axis forming a relatively narrow inlet positioned to receive said backing strip from said feed rollers and a relatively wide outlet opening into said backing strip discharge chute; and air nozzle means mounted in cooperable relation with said discharge chute for producing an air jet in said discharge chute directed toward said backing strip discharge receptacle, thereby conveying said backing strip along the length of said chute into said backing strip discharge receptacle.

* * * * *

UNITED STATES PATENT AND TRADEMARK OFFICE

CERTIFICATE OF CORRECTION

PATENT NO. : 4,253,788

DATED : March 3, 1981

INVENTOR(S) : Frank B. Oaks et al.

It is certified that error appears in the above-identified patent and that said Letters Patent are hereby corrected as shown below:

Column 2, line 17: "is" is changed to --in--.

Column 5, line 51: "casset" is changed to --cassette--.

Column 9, line 32: "roller" is changed to --rollers--.

Column 12, line 39: "of absence of film" is deleted.

Column 15, line 50: "said", first occurrence, is deleted.

Signed and Sealed this

*Fourth* Day of *August 1981*

[SEAL]

*Attest:*

GERALD J. MOSSINGHOFF

*Attesting Officer* *Commissioner of Patents and Trademarks*